Figure 1:
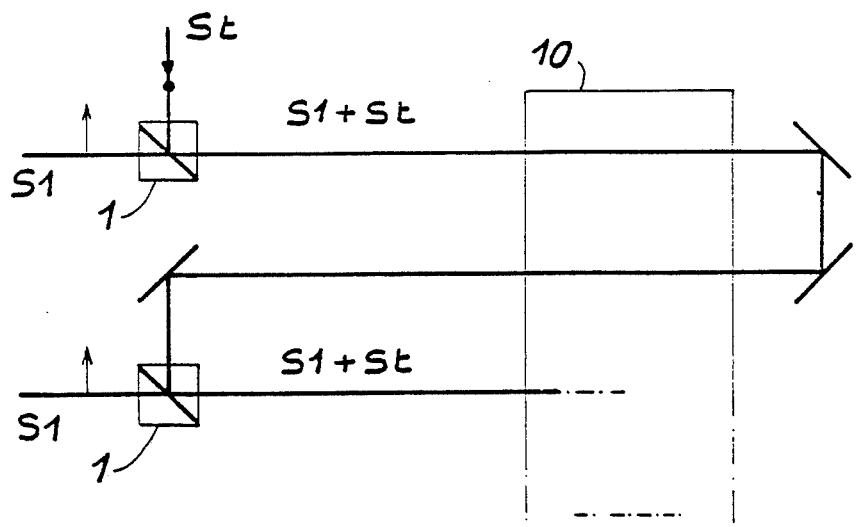

United States Patent [19]
Michon et al.

[11] Patent Number: 4,946,567
[45] Date of Patent: Aug. 7, 1990

[54] APPARATUS FOR THE DISTRIBUTION OF LASER BEAMS USED DURING A SELECTIVE REACTION IN A PROCESS FOR ISOTOPE SEPARATION BY LASERS

[75] Inventors: Maurice Michon, Draveil; Paul Rigny, Sceaux, both of France

[73] Assignee: Commissariat a l'Energie Atomique, Paris, France

[21] Appl. No.: 281,623

[22] Filed: Dec. 9, 1988

[30] Foreign Application Priority Data

Dec. 10, 1987 [FR] France ............................ 87 17233

[51] Int. Cl.⁵ .................... B01D 59/00; H01J 39/34
[52] U.S. Cl. ........................ 204/157.22; 204/157.2; 204/157.21; 250/423 P; 250/281; 250/284; 350/174; 350/370; 350/385
[58] Field of Search ............. 204/157.22, 157.21, 204/157.2; 250/423 P, 281, 284; 350/385, 370, 174

[56] References Cited

U.S. PATENT DOCUMENTS

| 4,035,638 | 7/1977 | Szöke et al. | 204/157.22 X |
| 4,072,590 | 2/1978 | Niemann et al. | 204/157.22 |
| 4,082,633 | 4/1978 | Eerkens | 204/157.22 |
| 4,174,150 | 11/1979 | Congleton | 350/174 |
| 4,189,646 | 2/1980 | Vanderleeden | 204/157.22 X |
| 4,254,336 | 3/1981 | Rostler | 250/294 |
| 4,762,402 | 8/1988 | Michon et al. | 350/370 |

FOREIGN PATENT DOCUMENTS 537265 6/1984 Australia .
2591510 6/1987 France .

Primary Examiner—Brooks H. Hunt
Assistant Examiner—Ngoclan T. Mai
Attorney, Agent, or Firm—Oblon, Spivak, McClelland, Maier & Neustadt

[57] ABSTRACT

Apparatus for the distribution of laser beams used during a selective reaction in a process for isotope separation by lasers. The system comprises in an enclosure (10), a material in the form of a vapor flow, from which it is wished to extract one species, and laser sources (12) supplying pulses along beams S1 ... Sn at selective excitation wavelengths λ1 ... λn and along a beam St at wavelength λt permitting a transforming of said excited species. The system incorporates partial reflection mirrors (Mi) arranged in such a way that the transmitted and reflected beams S1 ... Sn, St are superimposed. A first part (P1) of these beams is directed to the enclosure and a second part (P2) to the mirror (Mi+1). Return means (14) make it possible to adjust the length of the path in enclosure (10) between two mirrors (Mi) and (Mi+1).

7 Claims, 3 Drawing Sheets

APPARATUS FOR THE DISTRIBUTION OF LASER BEAMS USED DURING A SELECTIVE REACTION IN A PROCESS FOR ISOTOPE SEPARATION BY LASERS

DESCRIPTION

The present invention relates to an apparatus for the distribution of laser beams used during a selective reaction in a process for isotope separation by lasers. The invention is applicable to selective reactions such as the isotope separation of uranium by lasers.

In an isotope separation apparatus based on the selective excitation of one species or type followed by its photoionization, a major problem is caused by the small effective photoionization section. The photoionization laser beam at wavelength $\lambda i$ is absorbed to a much lower extent than that or those of selective excitation at wavelength $\lambda e$. Moreover, to retain a good selectivity, it is not possible to operate with an excessive power of the selected exciting beam. Thus, there would be a selectivity loss e.g. due to the spectral widening by saturation or to transitions wit several photons. Thus, it not possible to maintain the simultaneous presence of two beams throughout their path within the enclosure. Thus, the ionizing beam is not well used, its energy being wasted in the latter part of the path, where the selective exciting beam is highly attenuated. In order to bring about an optimum use of the energy of the different beams, it is possible to adapt their polarizations to the corresponding transitions and also make them follow different paths. The beam is returned to wavelengths $\lambda i$ over several passages within the reaction enclosure, one beam at wavelength $\lambda e$ being injected into the enclosure for each passage. Over the length of a passage within the enclosure, the beam at wavelength $\lambda e$ is completely absorbed.

In the known arrangements for the distribution of laser beams, the selective excitation and photoionization beams necessarily have different polarization in the irradiation zone. These polarizations are perpendicular if they are rectalinear, or circuit to the right and left.

Examples of such apparatuses are described in French Patent No. 85 04 827 of the Commissariat à l'Energie Atomique.

As a function of the chosen atomic transitions, it can be disadvantageous that the polarizations of the beams are fixed by the arrangement. The object of the present invention is to permit a better use of the energy of these beams by the free choice of the polarizations on each of the beams independently of one another and as a result of a good distribution of the intensity of the beams in the reaction enclosure.

More specifically, the present invention relates to an apparatus for the distribution of laser beams used during a selective reaction in a process for isotope separation by lasers comprising in an enclosure, a material whereof one species is to be extracted, said material being in the form of a vapour flow, laser sources supplying laser pulses along beams $S1 \ldots Sn$, n being an integer at least equal to one, at wavelength $\lambda i, \ldots \lambda n$ for selective excitation and along a beam $S_t$ at wavelength $\lambda t$ permitting a transformation of said excited species, means for the return of the beams permitting several passags through the enclosure, characterized in that it comprises partial reflection mirrors arranged in such a way that the beams $S1 \ldots Sn$, St transmitted and reflected are superimposed, a first part of said beams being directed towards the enclosure and another part towards the following partial reflection mirror.

The use of these partial reflection mirror makes it posssible to obviate the need for any polarizing element (such as a Glan prism) for superimposing the beam.

Return means make it possible to ajust the length of the path in the enclosure between two partial reflection mirros. Optical delay means permit the synchronization of the pulses of the beams from a partial reflection mirror and directed towards the next mirror with the pulses of the beam having passed through the enclosure.

According to a preferred embodiment of said apparatus, there are an adequate number of partial reflection mirrors so that following the final passage through the enclosure by the light beam, the fluence at wavelength $\lambda t$ is equal to the saturation fluence of said wavelength. In other words, the nummber of photons per pulse per surface unit at the considered wavelength (fluence) is equal, after pasing through the apparatus, to the inverse of effective interaction secetion (saturation fluence).

According to a preferred embodiment of the apparatus, the return means make it possible to adjust the length of the path in the enclosure, between two partial reflection mirrors, in such a way that the fluence at one of the wavelengths $\lambda i \ldots \lambda n$ is at least equal to the saturation fluence.

The choice of the reflection coefficient of the partial reflection mirrors, the length of the path in the enclosure between two mirrors and the number of said mirrors permits an optimum utilization of the energy of the different laser beams.

According to a constructional variant of the invention, the apparatus comprises, in an enclosure, a material from which it is wished to extract one species, said material being in the form of a vapour flow, laser sources supplying laser pulses along beams $S1 \ldots Sn$, n being an integer at least equal to 1, at selective excitation wavelengths $\lambda 1 \ldots \lambda n$ and along a beam St at wavelength $\lambda t$ permitting a transformation of said excited species and means for returning the beams permitting several passages through the enclosure.

This apparatus is characterized in that it comprises at least two stages. Each stage comprises:

a laser source Se, e being an integer between 1 and n, supplying puises at wavelength $\lambda e$, partial reflection mirrors arranged in such a way that, with the exception of beam Se, the transmitted and reflected beams $S1 \ldots Sn$, St are superimposed, a part of these beams being directed towards a partial reflection mirror and another part towards the following stage, partial reflection mirrors arranged in such a way that the transmitted and reflected beams $S1 \ldots Se \ldots Sn$, St are superimposed, part of these beams being directed towards the enclosure and another towards the following mirror, return means making it possible to ajust the length of the path in the enclosure between two partial reflection mirrors, optical delay means permitting the synchronization of the pulses coming from a partial reflection mirror and directed towards the next one with pulses having passed through the enclosure and means for the synchronization of the pulses from one stage with those supplied by the laser source Se of the following stage.

This apparatus is also characterized in that the residual beams, after passing through a stage are injected into the following stage.

According to a preferred embodiment, the number of stages is adequate to ensure that, following the final passage through the reaction enclosure by the light beam, the fluence at wavelength λt is equal to the saturation fluence for said wavelength.

According to preferred embodiment, the return means make it possible to adjust the length of the path in the enclosure, between two partial reflection mirrors, in such a way that the fluence at wavelength λe is equal to the saturation fluence for said wavelength.

Other features and advantages of the invention can be gathered from the following illustrative and non-limitative description with reference to the attached drawings, wherein show:

FIG. 1 a known arrangement of an apparatus for isotope separation by lasers.

Figure 2:
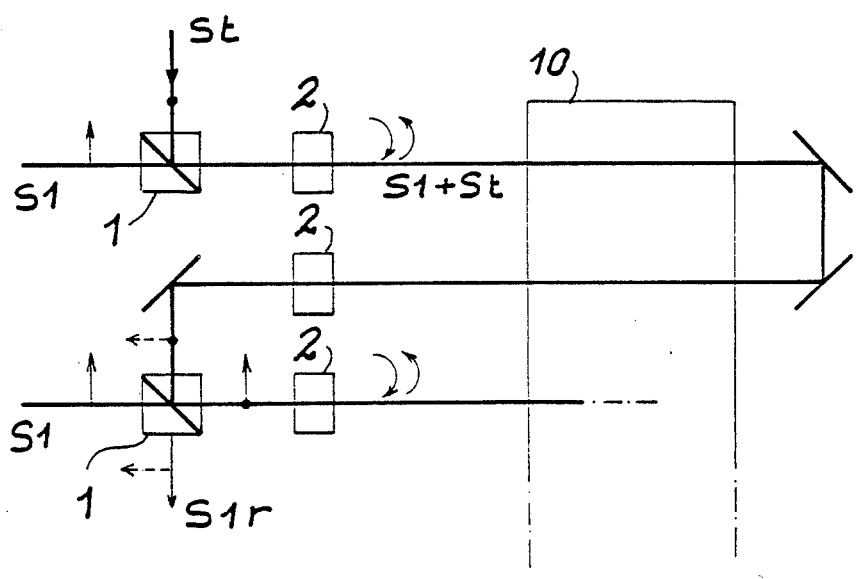

FIG. 2 a known variant of the apparatus of FIG. 1.

Figure 3:
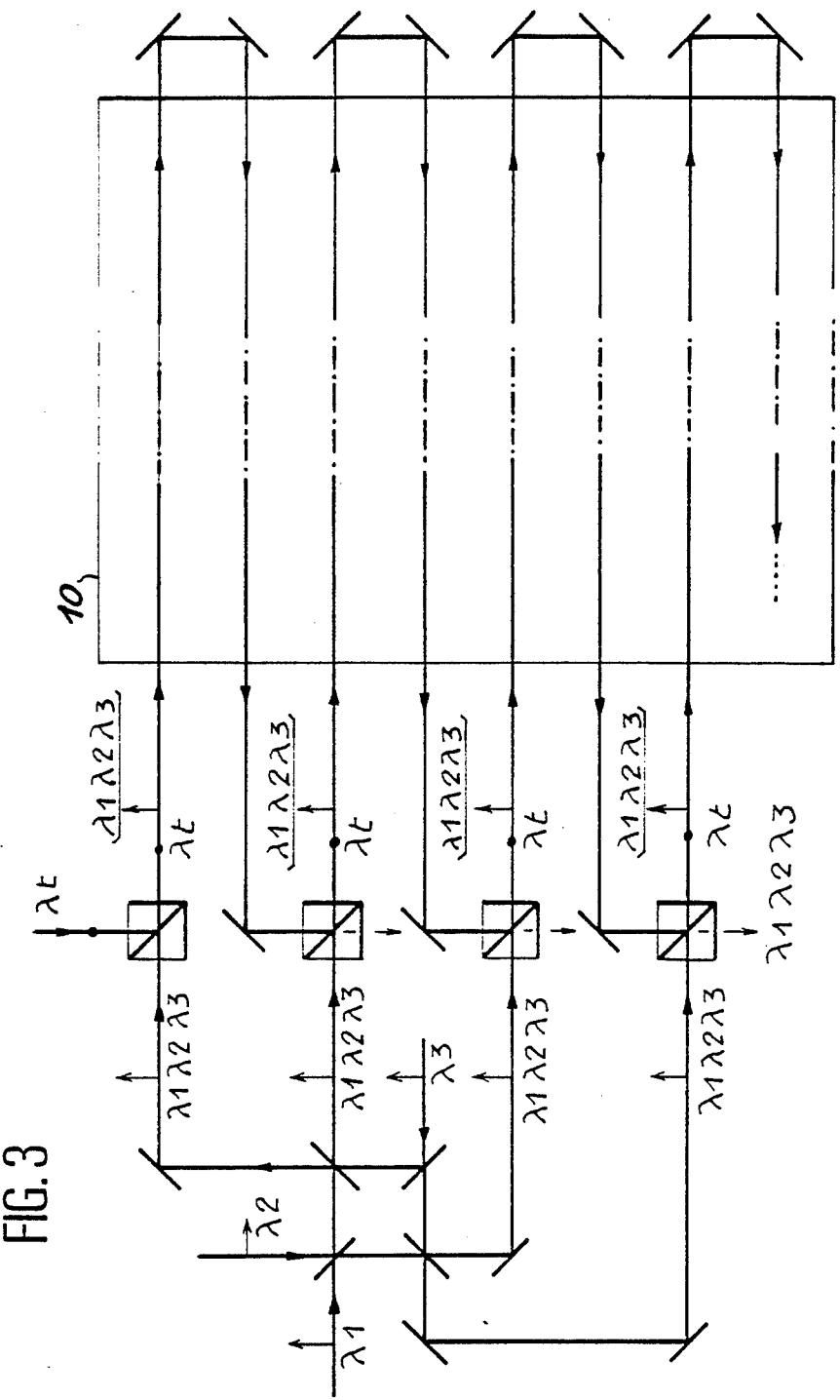

FIG. 3 another known variant of the apparatus of FIG. 1.

Figure 4:
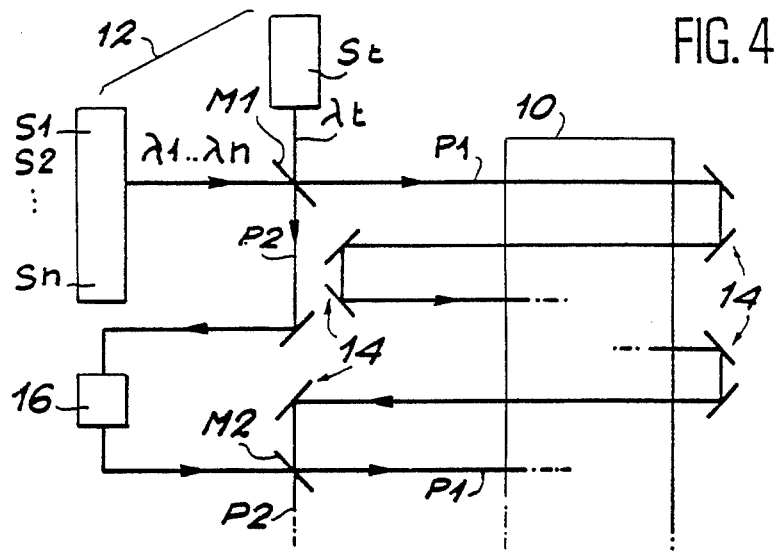

FIG. 4 the apparatus according to the invention.

Figure 5:
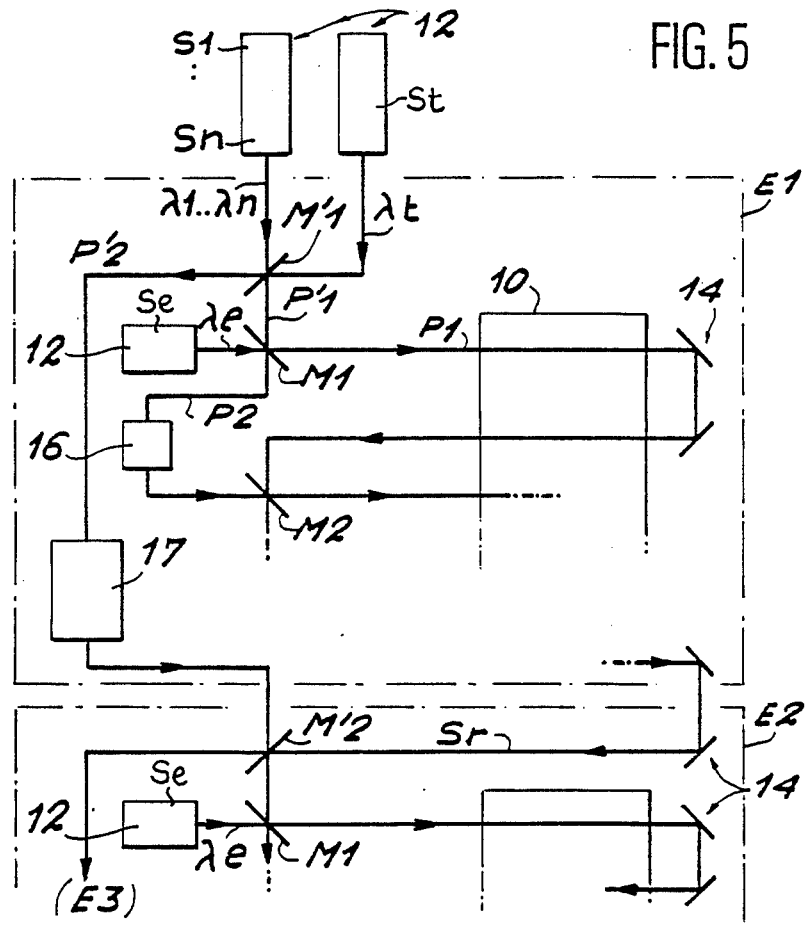

FIG. 5 a variant of the apparatus according to the invention.

FIG. 1 relates to the known arrangement based on apparatuses for isotope separation by lasers. The respectively exciting and photoionizing beam S1 and St with perpendicular polarization are superimposed and directed towards a reaction enclosure 10 via a glan prism 1. After passing through the enclosure several times, beam S1 is absorbed. The beam St is then supplied to a Glan prism 1. A new beam S1 is supplied by a not shown laser source. After passing through the Glan prism, the beams S1 and St are supplied to the enclosure and so on until beam St is completely absorbed.

FIG. 2 relates to a known variant of the preceding apparatus. Quarter-wave plates 2 make it possible to make the polarizations of beams S1 and St circular. Conversely, one quarter-wave plate renders the polarization of beam St at the entrance to the second Glan prism rectilinear. This apparatus makes it possible to eliminate any residual beam S1r in the second beam S1+St.

Thus, after passing through the quarter-wave plate, beam S1r reassumes a rectilinear polarization perpendicular to the polarization of beam St. Therefore the residual beam S1r is transmitted by the Glan prism and is not reflected like beam St. If this residual beam was present, it would interfere with the new beam S1+St.

FIG. 3 shows another variant of the apparatus of FIG. 1 and can be applied to uranium. The selective excitation beams S1, S2, S3 at respective wavelengths λ1, λ2, λ3 are grouped in accordance with the same polarization and the photoionization beam St has a different polarization.

FIG. 4 shows the apparatus according to the invention. Laser sources 12 supply light pulses at wavelength λ1 . . . λn along beams S1 . . . Sn and a beam St at wavelength λt. These beams S1 . . . Sn, St are reflected and transmitted by a first partial reflection mirror M1. Part P1 of said beams is directed to a reaction enclosure 10. Part P1 passes through the enclosure several times. Return means 14 make it possible to a adjust the length of said path and to direct the beam P1 to a second partial reflection mirror M2. Part P2 of the beams S1 . . . Sn, St transmitted and reflected by mirror M1 is directed to the second partial reflection mirror M2. The synchronization of the pulses from parts P1 and P2 is ensured by optical delay means 16. Level with the mirror M2, part of the pulses is directed to the enclosure and the other part to a not shown partial reflection mirror M3.

FIG. 5 shows a variant of the apparatus according to the invention. Laser sources 12 supply light beams S1 . . . Sn, St and Se at wavelengths λ1 . . . λn, λt, λe. The apparatus comprises at least two stages Ei, i being an integer at least equal to 1.

Each stage Ei comprises at least one partial reflection mirror M'1, which transmits and reflects the beams S1 . . . Sn, St. Each stage Ei also comprises a laser source 12 suppplying a beam Se at wavelength λe, which is absorbed to the greatest extent during the selective reaction process. Within each stage, a part P'1 of the beams S1 . . . Sn, St transmitted and reflected by M'1 is passed to a partial reflection mirror M1. This part P'1 and the beam Se are reflected and transmitted by M1. Part P1 of said beams is fed to a reaction enclosure 10, said part P1 passing through the enclosure several times. Return means 14 make it possible to adjust the length of said path and then to direct the beam P1 towards a second partial reflection mirror M2. Part P2 of the beams Se and P'1 transmitted and reflected by mirror M1 is directed to the second partial reflection mirror M2. The synchronization of the pulses from parts P1 and P2 is ensured by optical delay means 16. Level with mirror M2, part of the pulses is directed to enclosure 10 and the other part to a not shown partial reflection mirrror M3 and so on. The residual beam Sr, which has not been absorbed following these multiple passages through the partial reflection mirrors and the reaction enclosure 10 is directed, by return means 14, to stage Ei+1. Stage Ei comprises means 17 making it possible to direct part P'2 of the beams S1 . . . Sn, St transmitted and reflected by mirror M'i to stage Ei+1. These means 17 also permit the synchronization of the pulses of part P'2 with the pulses of beam Sr.

We claim:

1. Apparatus for the distribution of laser beams used during a laser isotope separation process comprising in an enclosure (10), a material whereof one species is to extracted to remove it from the enclosure, said material being in the form of a vapour flow, laser sources (12) supplying laser pulses along beams S1 . . . Sn, n being an integer at least equal to 1, at wavelength λ1, . . . λn for selective excitation and along a beam St at wavelength λt permitting a transformation of said excited species, means for return (14) of the beams permitting several passages through the enclosure (10), partial reflection mirrors, each partial reflection mirror Mi, i being an integer at least equal to 1, arranged in such way that the beams Sl, . . . , Sn, St transmitted and reflected are superimposed, a first part Pi of said beams being P2 directed towards the enclosure (10) and another part towards a partial reflection mirror Mi+1 following the partial reflection mirror Mi, optical delay means (16) permitting the synchronization of the pulses of beams P2 from a partial reflection mirror Mi and directed towards the mirror Mi+1 with pulses of beams having traversed enclosure (10) and return means (14) are provided to adjust the length of the path in enclosure (10) between two mirrors Mi and Mi+1.

2. Apparatus according to claim 1, where there is an adequate number of partial reflection mirrors to ensure that following the final passage through enclosure (10)

by the light beam, the fluence at wavelength $\lambda t$ is equal to the saturation fluence for said wavelength.

3. Apparatus according to claim 1, where the return means (14) make it possible to adjust the length of the path in enclosure (10) between two mirros Mi and Mi+1, in such a way that the fluence at one is wavelengths $\lambda 1 \ldots \lambda n$ is at least equal to the saturation fluence.

4. Apparatus for the distribution of laser beams used during a laser isotope separation process comprising:
  in an enclosure (10), a material whereof one species is to be extracted to remove it from the enclosure, said material being in the form of a vapour flow,
  first laser sources (12) supplying laser pulses along beams $S1 \ldots, Sn$, n being an integer at least equal to 1, at selective excitation wavelength $\lambda 1, \ldots, \lambda n$ and along a beam St at wavelength $\lambda t$ permitting a transformation of said excited species,
  means (14) for the return of the beams permitting several passages through the enclosure (10),
  at least two stages, each stage Ei, i being an integer at least equal to 1, comprising:
  a laser source Se, supplying laser pulses along a beam at wavelength $\lambda e$,
  a first series of partial reflection mirrors M'j, j being an integer at least equal to 1, arranged in such a way that, with the exception of beam Se, the transmitted and reflected beams $S1, \ldots, Sn$, St are superimposed, one part P'1 of said beams being directed to a mirror MK, the other part P'2 being directed to the next stage E1+1,
  a second series of partial reflection mirrors each partial reflection mirror Mk, k being an integer at least equal to 1, arranged in such a way that the transmitted and reflected beams $S1 \ldots, Se, \ldots, Sn$, St are superimposed, part P1 of the beams being directed to the enclosure (10) and another part P2 to a mirror Mk+1 following the partial reflection mirror Mk,
  return means (14) making it possible to adjust the length of the path in enclosure (10) between two mirrors Mk and Mk+1,
  optical delay means (16) permitting the synchronization of the pulses of the beams from a partial reflection mirror Mk and directed to a partial reflection mirror Mk+1 following the partial reflection moirror Mk with the pulses having traversed the enclosure (10) and
  means (17) for the synchronization of the pulses from one stage E1 with those supplied by the laser source Se at wavelength $\lambda e$ from stage E1+1.

5. Apparatus according to claim 4, where the residual beams, after passing through a stage E1, are injected into another stage E1+1.

6. Appparatus according to claim 4 where there is an adequate number of stages so that, following the final passage through enclosure (10) by the light beams, the fluence at wavelength $\lambda t$ is equal to the saturation fluence for said wavelength.

7. Apparatus according to claim 6, where the return means (14) make it possible to adjust the length of the path in the enclosure (10) between two mirrors (MK and Mk+1), in such a way that the fluence at wavelength $\lambda e$ is equal to the saturation fluence for said wavelength.

* * * * *